US008562476B2

(12) United States Patent
Simpson et al.

(10) Patent No.: US 8,562,476 B2
(45) Date of Patent: Oct. 22, 2013

(54) MANUAL TRANSMISSION USING CHAIN AND PLANETARY GEAR SET AS FINAL DRIVE

(75) Inventors: Roger T. Simpson, Ithaca, NY (US); Mark E. Michaels, Homer, NY (US)

(73) Assignee: BorgWarner Inc., Auburn Hills, MI (US)

( * ) Notice: Subject to any disclaimer, the term of this patent is extended or adjusted under 35 U.S.C. 154(b) by 316 days.

(21) Appl. No.: 12/991,468

(22) PCT Filed: May 12, 2009

(86) PCT No.: PCT/US2009/043534
§ 371 (c)(1),
(2), (4) Date: Feb. 11, 2011

(87) PCT Pub. No.: WO2009/140229
PCT Pub. Date: Nov. 19, 2009

(65) Prior Publication Data
US 2011/0165984 A1    Jul. 7, 2011

Related U.S. Application Data

(60) Provisional application No. 61/053,773, filed on May 16, 2008.

(51) Int. Cl.
*F16H 37/02*    (2006.01)
(52) U.S. Cl.
USPC .......................................... 475/213; 475/221
(58) Field of Classification Search
None
See application file for complete search history.

(56) References Cited

U.S. PATENT DOCUMENTS

| 5,055,094 | A  | 10/1991 | Cataldo |
| 5,183,444 | A  | 2/1993  | Robbins |
| 5,690,575 | A  | 11/1997 | Lippitsch |
| 5,695,426 | A  | 12/1997 | Lippitsch |
| 6,485,390 | B2 | 11/2002 | Inoue |
| 6,547,685 | B2 | 4/2003  | Kawada et al. |
| 2004/0082426 | A1 | 4/2004 | Raghavan et al. |
| 2007/0010364 | A1 | 1/2007 | Bucknor et al. |

FOREIGN PATENT DOCUMENTS

| JP | 63-232022 A  | 9/1988 |
| JP | 63232022 A   | 9/1988 |
| JP | 01-309819 A  | 12/1989 |

(Continued)

OTHER PUBLICATIONS

International Search Report for PCT/US2009/043534 mailed Dec. 4, 2009, 10pgs.
Automotive Transmissions—Fundamentals, Selection, Design and Application; Lechner et al.; 1999; pp. 126-128.
"Planetary Gear Sets"; http://www.familycar.com/Transmission.htm#Planetary%20Gear%20Sets; as early as Aug. 29, 2007; 2pgs.

(Continued)

*Primary Examiner* — Erin D Bishop
(74) *Attorney, Agent, or Firm* — Brown & Michaels, PC

(57) ABSTRACT

A transmission for an engine or motor with a reduced package size and increased efficiency comprising: an input sprocket, an output sprocket, a chain, and a planetary gear set. The output sprocket is drivingly connecting to the input sprocket through the chain. The output sprocket has a hollow center portion that receives the sun gear of the planetary gear set. The planetary gear set also includes at least two planet gears meshed with the sun gear which are mounted to a fixed planet carrier for driving a differential with a ring gear portion. When the input sprocket is rotated in a first direction, the chain drives the output sprocket and the sun gear in the first direction, and the sun gear drives the planet gears to rotate in a second direction, opposite the first direction, driving the ring gear portion and differential in the second direction.

4 Claims, 3 Drawing Sheets

(56) References Cited

FOREIGN PATENT DOCUMENTS

| | | |
|---|---|---|
| JP | 02-077330 A | 3/1990 |
| JP | 08-074946 A | 3/1996 |
| JP | 2772526 B2 | 7/1998 |
| JP | 11-115514 A | 4/1999 |

OTHER PUBLICATIONS

"Ford CD4E Transmission" http://en.wikipedia.org/wiki/Ford_CD4E_transmission; as early as 1994; 1 pg.
"TORSEN Traction Differential T-2 (Type 2 or Type B)"; http://www.torsen.com/products/T-2.htm; as early as Jan. 25, 2006; 4pgs.
"2006 Ford Focus L4-2.0L VIN N—Main Components and Functions" Alldata Online; as early as 2006; 10 pgs.

MANUAL TRANSMISSION USING CHAIN AND PLANETARY GEAR SET AS FINAL DRIVE

REFERENCE TO RELATED APPLICATIONS

This application claims one or more inventions which were disclosed in Provisional Application No. 61/053,773, filed May 16, 2008, entitled "MANUAL TRANSMISSION USING CHAIN AND PLANETARY GEAR SET AS FINAL DRIVE". The benefit under 35 USC §119(e) of the United States provisional application is hereby claimed, and the aforementioned application is hereby incorporated herein by reference.

BACKGROUND OF THE INVENTION

1. Field of the Invention

The invention pertains to the field of manual transmissions. More particularly, the invention pertains to manual transmissions using a chain and planetary gear set as the final drive.

2. Description of Related Art

In the present automobile market, there is a constant search to decrease the package size of components and increase the efficiency of the engine components.

Efficiency and package size improvements have been made in automatic transmissions. For example, in the GMPT 6T40 and 6T45, which are currently in production and shown in prior art FIG. 1, the layshaft of the automatic transmission has been removed and a chain 8 surrounds the input sprocket 4 coupled to the transmission output shaft (not shown) and an output sprocket 6 coupled to the sun gear 16 of a planetary set. The sun gear 16 is driven by the output sprocket 6, driving the planet carrier 18 and the differential 20, formed as one piece. The ring gear 12 is fixed to the housing 10.

FIG. 2 shows a conventional manual transmission. In a conventional manual transmission, the pinion gear 5 is coupled to the manual transmission output shaft 2. The pinion gear 5 is meshed with and drives a ring gear 7. The ring gear 7 is coupled to the differential housing and the differential 20, directly driving the differential 20, which in turn drives the front axles 15 to the wheels. The ring gear 7 has a large mass, large rotational inertia, and is very large in diameter, measuring to be approximately 200-220 mm in diameter. The ring gear 7 rotates in an opposite direction from the manual transmission output shaft 2 with a 3 to 4 times speed reduction. By using such a large diameter ring gear 7, a 3.5 to 1 speed reduction ratio is achieved at the cost of engine compartment space and large manual transmission packaging.

While efficiency and package size have been improved in automatic transmissions, no effort has been made to do so in transmissions with geared final drives which have a reverse direction geared output, such as dual clutch transmissions, automated manual transmissions, hybrids, electric, CVT, two axis manual transmissions, and three axis manual transmissions.

SUMMARY OF THE INVENTION

A transmission for an engine or motor with a reduced package size and increased efficiency comprising: an input sprocket, a chain, an output sprocket, and a planetary gear set. The output sprocket is drivingly connecting to the input sprocket through a chain. The output sprocket has a hollow center portion that receives the sun gear of the planetary gear set. The planetary gear set also includes at least two planet gears meshed with the sun gear which are mounted to a fixed planet carrier for driving a differential with a ring gear portion. When the input sprocket is rotated in a first direction, the chain drives the output sprocket and the sun gear in the first direction, and the sun gear drives the planet gears to rotate in a second direction, opposite the first direction, driving the ring gear portion and differential in the second direction.

The present invention reduces the overall final drive package, making it radially smaller with a lower rotational inertia and decreased weight of the final drive.

The chain is preferably an inverted tooth chain, although other power transmission chains may be used. The number of teeth on the sun gear, planet gears, and ring gear formed as part of the differential housing may be altered to change the speed reduction ratio as applicable to different transmissions.

The transmission may be any of the manual transmissions with geared final drives which have a reverse direction geared output, such as dual clutch transmissions, automated manual transmissions, hybrids, electric, CVT, two axis manual transmissions, and three axis transmissions.

DETAILED DESCRIPTION OF THE INVENTION

Figure 1:
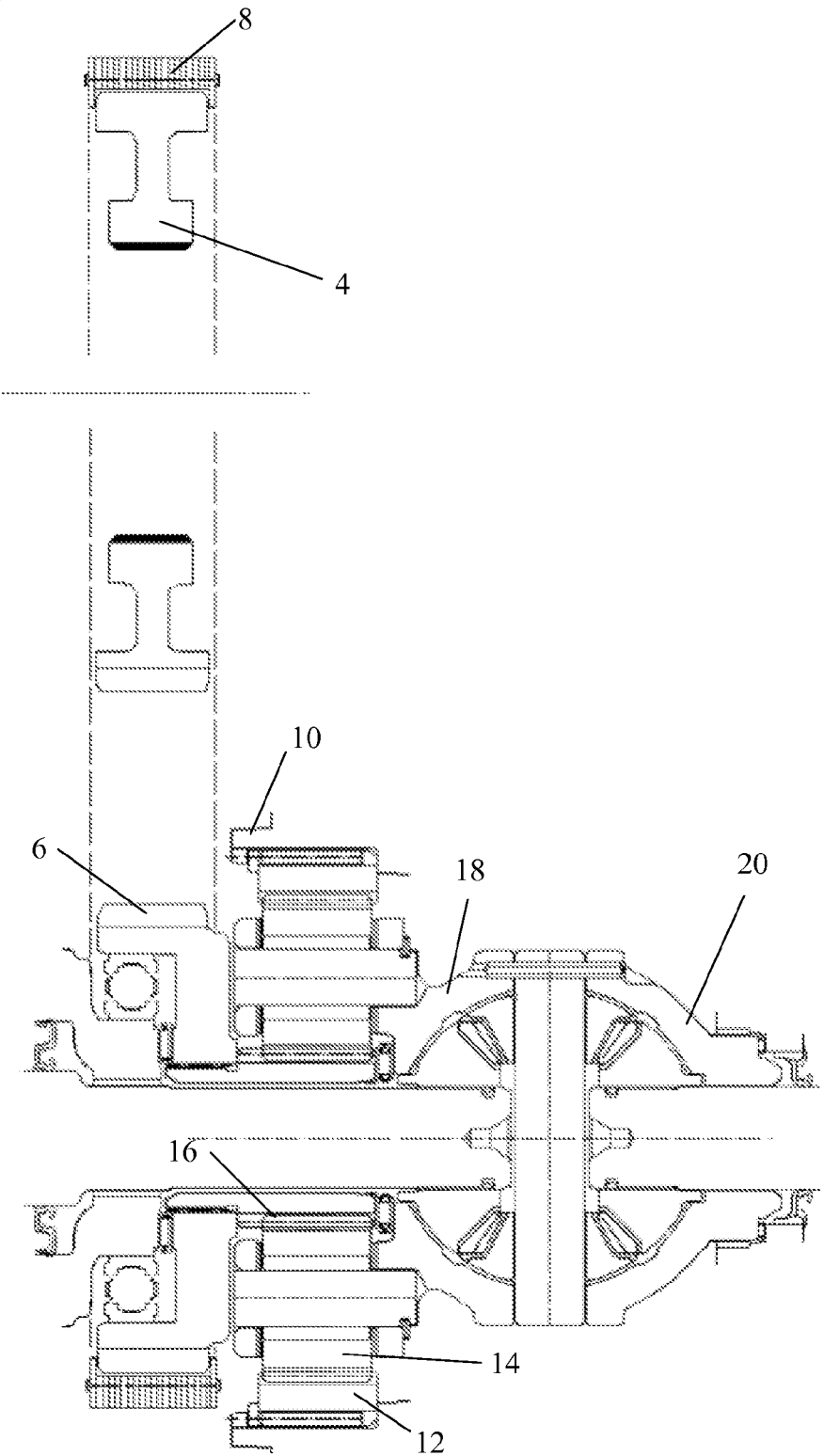
FIG. 1 shows a schematic of the prior art automatic transmission GMPT 6T40 and GMPT 6T45 final drives.
Figure 2:
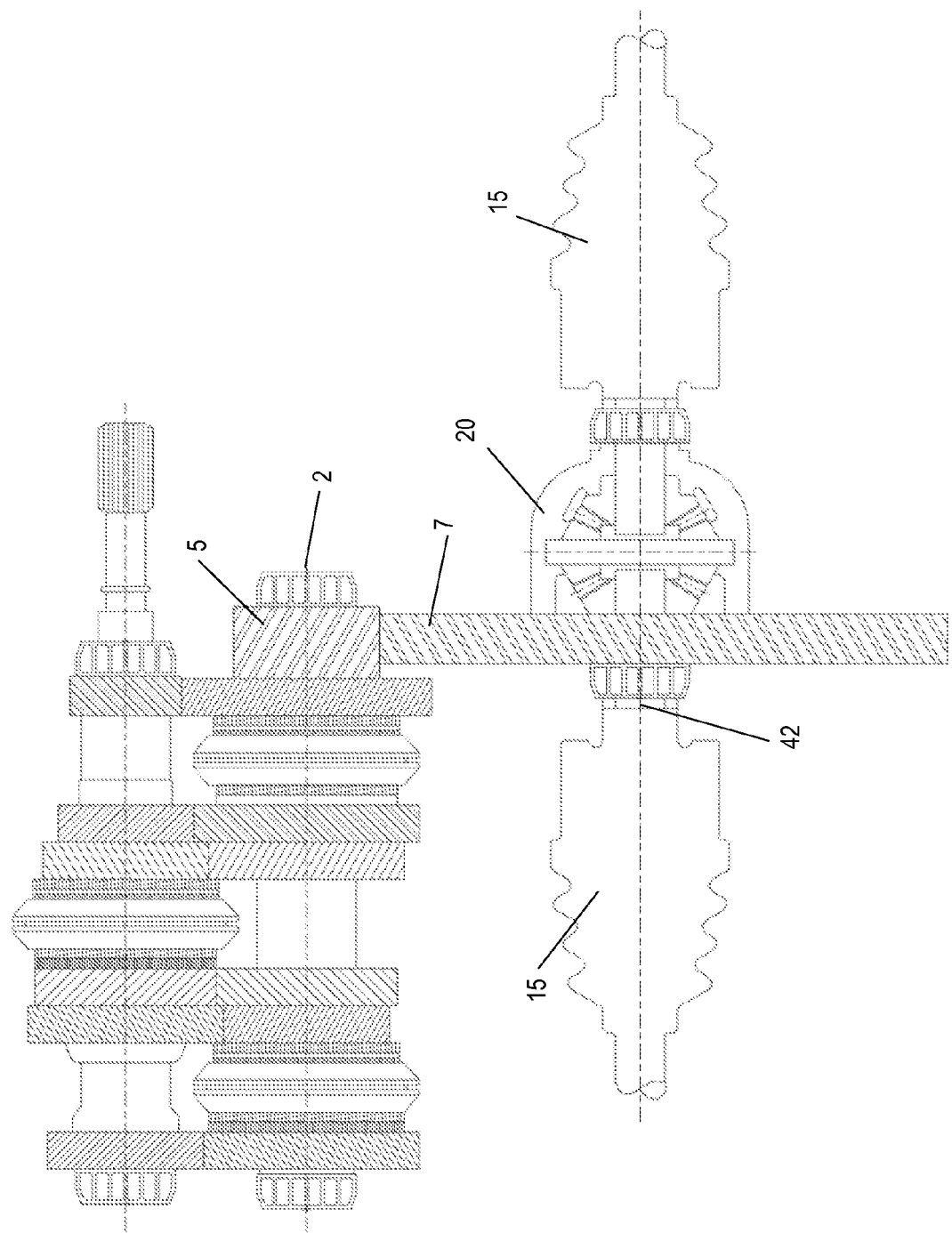
FIG. 2 shows a schematic of a prior art manual transmission with a gear as the final drive.

The present invention replaces the pinion gear 5 and the helical cut ring gear 7 of the conventional manual transmission with a chain 38, input and output sprockets 36, 40, a planetary gear set 32, and a ring gear formed as part of the differential housing 20. The ring gear 7 and pinion gears of any of the manual transmissions with geared final drives, which have a reverse direction output such as dual clutch transmissions, automated manual transmissions, hybrids, electric, two axis manual transmissions, and three axis transmissions may be replaced by the chain 38, the sprockets 36, 40, and the planetary gear set 32 of the present invention to drive the differential 20.

Figure 3:
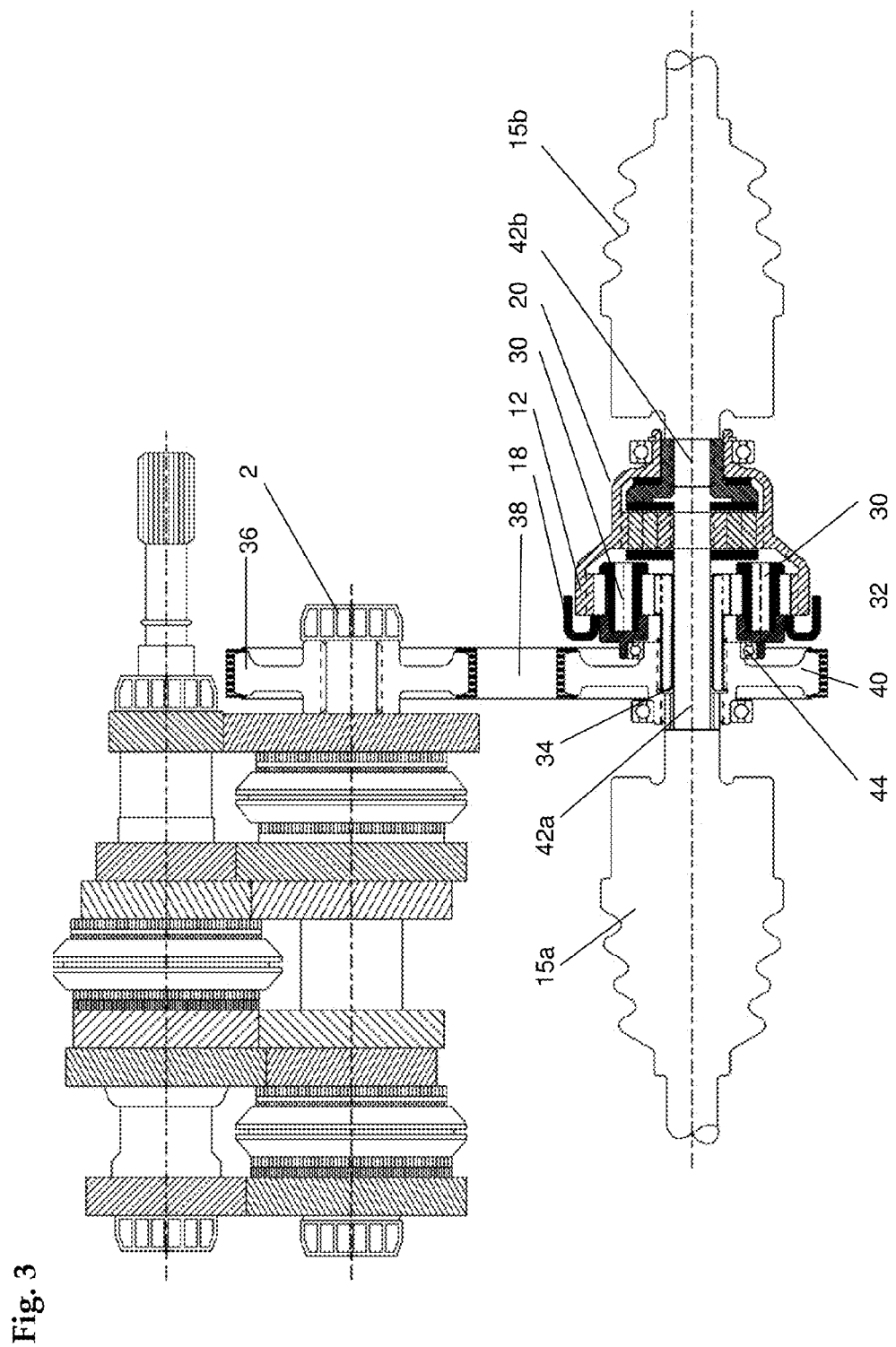
FIG. 3 shows a schematic of a manual transmission of the present invention with a chain and planetary gear set as the final drive.

The planet carrier 18 is fixed, and thus held from rotating the differential 20 or the ring gear 12. The arrangement shown in FIG. 3 maintains the reversal or rotation in an opposite direction from the manual transmission output shaft 2 with a 3 to 4 times speed reduction, while significantly reducing the package size of the manual transmission.

An input sprocket 36 is mounted for rotation with the manual transmission output shaft 2. An output sprocket 40 has a hollow center portion that is splined and receives helical sun gear 34 of a planetary gear set 32. A first axle shaft 42a leading to the axles 15a and the wheels on a first side passes through the hollow center of the helical sun gear 34 and is received by one side of the differential 20. A second axle shaft 42b leading to axles 15b and the wheels on a second side passes through and is received by the other side of the differential 20 of the planetary gear set 32. Ball bearings 44 are present between the output sprocket 40 and the planetary gear set 32 to provide support for the sun gear 34.

A chain 38 is wrapped around the input sprocket 36 on the manual transmission output shaft 2 and the output sprocket 40, drivingly connecting the manual transmission output shaft 2 and the sun gear 34 of the planetary gear set 32 to a differential 20. The planetary gear set 32 includes the sun gear 34 on the first axle shaft 42a surrounded by and meshed with at least two planet gears 30. While two planet gears 30 are shown, preferably at least three planet gears are used. The planet gears 30 are also mounted to a planet carrier 18 and mesh with a ring gear 12, which is formed as part of the differential 20 housing. The planet carrier 18 is fixed or held. As the sun gear 34 rotates in a clockwise direction, the planet gears 30 rotate counterclockwise, and drive the ring gear 12 in a counterclockwise direction. The ring gear 12, formed as one piece with the differential housing, drives the differential 20.

When the manual transmission output shaft 2 rotates clockwise, the input sprocket 36 rotates, driving the chain 38 and the output sprocket 40 splined to the sun gear 34, driving the sun gear 34. The sun gear rotates clockwise, causing the planet gears 30 to rotate counterclockwise, driving the ring gear 12 and the differential 20 in a counterclockwise direction, as well as the first and second axle shafts 42a, 42b.

The present invention reduces the overall final drive package, making it radially smaller with a lower rotational inertia and decreased weight of the final drive.

The inverted tooth chain is preferably a HyVo® chain, although other power transmission chains may be used. The number of teeth on the sun gear, planet gears, and ring gear formed as part of the differential housing may be altered to change the speed reduction ratio as applicable to different transmissions.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A transmission with a reduced package size and reduced mass for an engine, the transmission comprising:
    an input sprocket;
    an output sprocket with a hollow center portion drivingly connecting to the input sprocket through a chain;
    a planetary gear set comprising: a sun gear received by the hollow center portion of the output sprocket, at least two planet gears meshed with the sun gear and mounted to a planet carrier, with the planet carrier fixed relative to the engine; and
    a differential with a ring gear portion driven by the planetary gear set;
    wherein when the input sprocket is rotated in a first direction, the chain drives the output sprocket in the first direction and drives the sun gear in the first direction, the sun gear drives the at least two planet gears to rotate in a second direction, opposite the first direction, and the at least two planet gears drive the ring gear portion of the differential, such that the differential is driven in the second direction directly by the ring gear portion.

2. The transmission of claim 1, further comprising ball bearings between the output sprocket and the planetary gear set to provide support to the sun gear.

3. The transmission of claim 1, wherein the ring gear portion is formed as one piece with the differential.

4. The transmission of claim 1, wherein the first direction is clockwise and the second direction is counterclockwise.

* * * * *